United States Patent
Dahlbäck

(10) Patent No.: US 8,257,518 B2
(45) Date of Patent: Sep. 4, 2012

(54) METHOD, USE AND DEVICE RELATING TO NUCLEAR LIGHT WATER REACTORS

(75) Inventor: Mats Dahlbäck, Västerås (SE)

(73) Assignee: Westinghouse Electric Sweden AB, Vasteras (SE)

(*) Notice: Subject to any disclaimer, the term of this patent is extended or adjusted under 35 U.S.C. 154(b) by 1226 days.

(21) Appl. No.: 10/538,973

(22) PCT Filed: Jan. 7, 2004

(86) PCT No.: PCT/SE2004/000003
§ 371 (c)(1),
(2), (4) Date: Jun. 14, 2005

(87) PCT Pub. No.: WO2004/063413
PCT Pub. Date: Jul. 29, 2004

(65) Prior Publication Data
US 2006/0144484 A1    Jul. 6, 2006

(30) Foreign Application Priority Data
Jan. 8, 2003  (SE) ........................ 0300015

(51) Int. Cl.
*C22F 1/18*    (2006.01)
(52) U.S. Cl. ........................ 148/672; 148/421
(58) Field of Classification Search ................ 148/421, 148/672; 376/353
See application file for complete search history.

(56) References Cited

U.S. PATENT DOCUMENTS

| | | |
|---|---|---|
| 3,826,124 A | 7/1974 | Baksay |
| 4,717,427 A | 1/1988 | Morel et al. |
| 6,077,369 A | 6/2000 | Kusano et al. |
| 6,149,738 A * | 11/2000 | Dahlback ............... 148/421 |
| 6,167,104 A | 12/2000 | Garzarolli et al. |

FOREIGN PATENT DOCUMENTS

| | | |
|---|---|---|
| JP | 4-99255 A | 3/1992 |
| JP | 4-99256 A | 3/1992 |
| JP | 4-154943 A | 5/1992 |
| JP | 4-154944 A | 5/1992 |
| JP | 04160138 | 6/1992 |
| JP | 05009688 | 1/1993 |
| JP | 0517837 A | 8/2006 |
| JP | 0519079 A | 8/2006 |
| WO | WO 97/40659 | 11/1997 |

* cited by examiner

Primary Examiner — Emily Le
Assistant Examiner — Weiping Zhu
(74) Attorney, Agent, or Firm — Michaud-Kinney Group LLP

(57) ABSTRACT

The invention concerns a method of producing and treating a sheet suited to be used as a component or as a part of a component in a fuel assembly for a nuclear light water reactor, which method comprises:

a) producing a sheet of a Zr-based alloy by forging, hot rolling and cold rolling in a suitable number of steps, b) carrying out an α+β quenching or a β quenching of the sheet when the sheet has been produced to a thickness which is equal to or almost equal to the final thickness of the finished sheet, c) heat treating the sheet in the α-phase temperature range of said alloy, wherein the sheet is stretched during the heat treatment according to step c).

The invention also concerns a use of a sheet that is produced and treated according to this method, and to methods and fuel assemblies of which said sheet forms a part.

6 Claims, 2 Drawing Sheets

METHOD, USE AND DEVICE RELATING TO NUCLEAR LIGHT WATER REACTORS

BACKGROUND OF THE INVENTION AND PRIOR ART

The present invention concerns a method of producing and treating a sheet suited to be used as a component or as a part of a component in a fuel assembly for a nuclear light water reactor, which method comprises the following steps:
a) producing a sheet of a Zr-based alloy by forging, hot rolling and cold rolling in a suitable number of steps, wherein said alloy contains at least 96 weight percent Zr and is of such a kind that the sheet is suitable to be used for said component,
b) carrying out an $\alpha+\beta$ quenching or a $\beta$ quenching of the sheet when the sheet has been produced to a thickness which is equal to the final thickness, or at least almost equal to the final thickness, of the finished sheet,
c) heat treatment of the sheet in the $\alpha$-phase temperature range of said alloy,
wherein step c) is carried out after steps a) and b) have been carried out.

The invention also concerns a use and devices which will be described below.

The above described method may for example be used for producing channel boxes for fuel assemblies for a boiling water reactor (BWR). Such a method is for example known through WO-A1-97/40659.

Below first an example of a known fuel assembly for a BWR will be described with reference to FIGS. 1-3.

FIG. 1 thus schematically shows a fuel assembly for a BWR. The fuel assembly comprises a channel box 2 (which here is only shown to the right in the figure). Inside the channel box 2 a number of fuel rods 3 are arranged. The fuel rods 3 extend from a top plate 5 to a bottom plate 6. The fuel rods 3 consist of cladding tubes which contain pellets with nuclear fuel material. In the figure a number of pellets 4 are symbolically shown. At the top, the fuel rods 3 are provided with end plugs 8. The fuel rods abut against the lower side of the top plate 5 with the help of coiled springs 9. A plurality of spacers 7 are arranged for holding the fuel rods 3 at a distance from each other. The fuel assembly is long and thus has a longitudinal direction which is here indicated with a central axis 10. The fuel assembly may often comprise a water channel which usually extends over substantially the whole length of the fuel assembly and which enables a flow of non-boiling water up through the fuel assembly.

Figure 4:
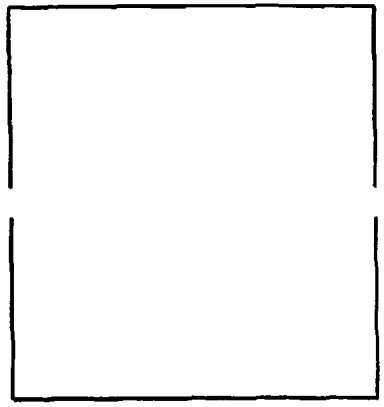
Figure 5:
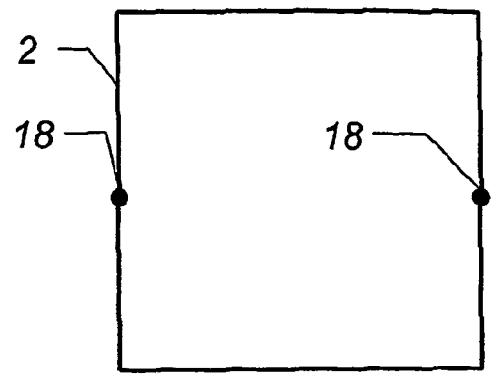

Both the above mentioned channel box 2 and the water channels 12, 14 and 16 are often produced of sheet materials which are formed and welded together in a suitable manner such as is well known to a person with knowledge within the field. Concerning the channel box 2, this can be produced by producing two sheets. Each sheet is bent such that a U-shaped profile is achieved. These U-shaped profiles can then be welded together such that a channel box 2 with a square cross-section is obtained. FIG. 4 indicates schematically a cross-section of two such U-shaped profiles before they have been joined and welded together. FIG. 5 shows the channel box 2 when the two U-shaped profiles have been welded together. The weld seams are here indicated by 18.

Channel boxes and water channels for fuel assemblies are usually produced in different Zr-based alloys which are well known to a person with knowledge within the field. For example, the well-known alloys Zircaloy-2 and Zircaloy-4 may be used.

In the very particular environment that a nuclear reactor constitutes, the components that form part thereof have to meet many requirements. A very large number of suggestions for the selection of material and for methods of production of components for fuel assemblies for nuclear reactors have therefore been produced. Even small modifications in the composition of alloys or in parameters of production can have a large importance for the properties of the components.

The above mentioned WO-A1-97/40659 describes a method of producing sheet material of a Zr-based alloy for producing channel boxes for fuel assemblies for a BWR. According to the described method, a sheet of the Zr-based alloy is produced by forging, hot rolling and cold rolling in a number of steps. Between the rolling steps a heat treatment may be carried out. When the sheet has been produced to the final or almost the final dimension it goes through a $\beta$ quenching. Through the $\beta$ quenching, the properties of the sheet are improved. Among other things, the corrosion properties are thereby improved. Furthermore, through the $\beta$ quenching a more randomised texture of the crystal grains are achieved, which works against the tendency of the sheet to be deformed in particular selected directions. With a randomised texture is meant that the crystal grains are directed randomly in different directions. With a non-randomised texture is thus meant that the crystal grains tend to be directed in one or some particular directions to a larger extent. A sheet with a non-randomised texture therefore tends to be deformed in particular selected directions.

In this context it can be noted that the used Zr-alloys exist in an $\alpha$-phase at lower temperatures (for example at room temperature). In the $\alpha$-phase, the crystal structure of the material is hcp. At higher temperatures (for example for Zircaloy-4 above about 980° C.) the alloy exists in $\beta$-phase. In this phase, the crystal structure is bcc. At a temperature which for example for Zircaloy-4 is between 810° C. and 980° C. the alloy exists in a mixture of $\alpha$-phase and $\beta$-phase, a so-called $\alpha+\beta$-phase.

According to the above mentioned WO-A1-97/40659, the sheet may go through a heat treatment in the $\alpha$-phase temperature range after said $\beta$ quenching. Thereby the corrosion properties of the sheet are further improved.

SUMMARY OF THE INVENTION

A purpose of the present invention is therefore to provide a method of producing and treating sheets which have further improved properties. A purpose is thereby to increase the flatness and the straightness of the produced sheet, such that subsequent treatments in order to achieve a high flatness or straightness of the sheet can be avoided. A further purpose is to provide such a method which may be carried out with relatively simple means.

These purposes are achieved with a method comprising the steps of:
(a) producing a sheet of a Zr-based alloy by forging, hot rolling and cold rolling in a suitable number of steps, wherein said alloy contains at least 96 weight percent Zr and is of such a kind that the sheet is suitable to be used for said component, (b) carrying out an α+β quenching or a β quenching of the sheet when the sheet has been produced to a thickness which is equal to the final thickness, or at least almost equal to the final thickness, of the finished sheet, (c) heat treatment of the sheet in the α-phase temperature range of said alloy, wherein step c) is carried out after steps a) and b) have been carried out.

During β quenching, as has been explained above, a phase transformation from bcc structure to hcp structure takes place. This phase transformation partly also takes place at an α+β quenching. Since the phases have different structure and different volume, a change of volume takes place during this transformation. This change of volume leads to the fact that large tensions are introduced into the material. These tensions lead to the fact that the flatness of the produced sheet may not be good after such a phase transformation. According to the present invention, the sheet is stretched during the heat treatment in the α-phase temperature range of the alloy which is carried out after the quenching of the material. Since the sheet is stretched, the tensions that have been created during the above described phase transformation from bcc to hcp structure are released. Thereby a flat and straight sheet is obtained. During the heat treatment according to step c) also improved corrosion properties are achieved since this heat treatment makes it possible for so-called secondary phase particles to grow. Since the sheet is stretched during the heat treatment, the growth of secondary phase particles takes place faster since the stretching increases the diffusion speed. Since the heat treatment during the deformation leads to a considerably faster diffusion, it is possible to control the degree of growth of secondary phase particles through the applied deformation. This is advantageous, in particular for a heat treatment in continuous oven process. For a continuous oven process with conventionally used ovens, it may otherwise be difficult to achieve a sufficiently long time of heating in order to obtain the desired growth of secondary phase particles. Since the sheet is stretched during the heat treatment, according to the present invention a sufficient growth of secondary phase particles is achieved also in a continuous oven process.

Preferably, the heat treatment according to above-described step c) should not be carried out during too large of a deformation, since this may lead to the hcp structure recrystallizing to new and larger grains, which may lead to a randomised grain texture obtained through quenching that is deteriorated by recrystallization and grain growth which also leads to an impaired ductility because of the grain growth.

According to a preferred manner of carrying out the method, the heat treatment during the stretching is the last heat treatment that the sheet goes through before it is shaped and assembled to the component for which it is used. It is however conceivable that a certain heat treatment can be carried out also after the above mentioned step c). Such a heat treatment ought however to be of such a kind that the structure of the material that is achieved during the heat treatment during the stretching is not destroyed.

Possibly, the sheet may be stretched also between the steps b) and c), i.e. also before the heat treatment and the stretching according to step c). However, normally such a pre-stretching is not necessary.

According to a preferred manner of carrying out the method, step b) is a β quenching. As has been mentioned above, the quenching may either be an α+β quenching or a β quenching. The best properties of the sheet are however obtained by a β quenching. Furthermore, the above mentioned change of volume which occurs during the stretching is more prominent at a β quenching. The invention is thus particularly advantageously when a β quenching is carried out in step b).

Preferably, said stretching is carried out at a temperature of at most the temperature which constitutes the highest temperature in the α-phase temperature range of the alloy and at least at the temperature which is about 70% of the highest temperature with regard to ° K, most preferred at a temperature which is between 80% and 98% of said highest temperature with regard to ° K. For a continuous oven process, i.e. a process where the sheet continuously is moved in an oven, preferably the stretching is carried out at a temperature which is between 90% and 96% of said highest temperature with regard to ° K. For the sake of clarity, it may be noted that for example Zircaloy-4 exists in α-phase up to about 810° C. and in β-phase over about 980° C. Therebetween, the alloy exists in α+β -phase. Said highest temperature constitutes in this case thus 810° C., which corresponds to 1083° K. For example, a temperature of 750° C. (which is 1023° K) thus constitutes about 94% of said highest temperature.

Suitably said stretching is carried out such that the sheet directly after having gone through the stretching has a remaining elongation compared to the state of the sheet immediately before the stretching. The remaining elongation may suitably be at least 0.1%. Even if it is possible for some alloy that the remaining elongation may exceed 7%, the remaining elongation is, according to a preferred embodiment, between 0.1% and 7%, most preferred between 0.2% and 4%. Preferably, the stretching is carried out such that said elongation is lower than the critical degree of deformation of the alloy. It should be noted that when the sheet cools, it contracts somewhat in accordance with the co-efficient of heat extension of the material. For this reason, the remaining elongation has above been defined for the state in which the sheet is immediately before and after the stretching, i.e. before it has cooled down and thereby contracted because of the temperature difference. As is clear from the above mentioned preferred elongations, it is only necessary with a small remaining elongation in order to release the tensions that have been created during the quenching of the material. By the critical degree of deformation is meant the degree of deformation where the α-phase grains recrystallize to new and larger grains. Even if the deformation should somewhat exceed the critical degree of deformation, only a marginal change of the texture of the material is obtained which does not have any larger negative effect on the material properties. However, the ductility of the material may be effected negatively if the grains formed are too large. Preferably, the degree of deformation is therefore lower than the critical degree of deformation of the alloy.

The component suitably defines a longitudinal direction which, when the component is used as intended in said fuel assembly, is at least substantially parallel to the longitudinal direction of the fuel assembly. The stretching of the sheet may then suitably be carried out in a direction which corresponds to the longitudinal direction of the component for which the sheet is intended. The sheet may suitably be long and thereby the stretching may suitably be carried out in the longitudinal direction of the sheet.

Another aspect of the invention concers the use of a sheet produced and treated according to the method according to any of the above described manners. The sheet is thereby used as said component or as part of said component in a fuel assembly for a nuclear light water reactor. Since the produced sheet has good properties and is flat and straight, it is suitably to be used for a component in a nuclear light water reactor.

According to a preferred use, said component is a channel box which defines an inner space, inside of the channel box, in the fuel assembly, wherein a plurality of fuel rods are arranged in said inner space and wherein said sheet is used for at least one of the walls of the channel box.

Preferably, the above mentioned fuel assembly is a fuel assembly for a nuclear boiler water reactor.

According to another advantageous use, said component is a water channel arranged in the fuel assembly in order to enable a flow through the fuel assembly of non-boiling water, and wherein said sheet is used as at least one wall of said water channel.

Since channel boxes and water channels have an extension which normally constitutes almost the whole length of the fuel assembly, it is important that these components have good properties and good flatness and straightness. Therefore, with advantage, the sheet produced and treated according to the method according to the present invention is used for these components.

The invention also concerns a method of producing a channel box for a fuel assembly for a nuclear boiling water reactor, which method comprises:

producing and treating a plurality of sheets with the method according to any of the above described embodiments, and accomplishing a suitable shape of these sheets and joining the sheets such that said channel box is formed.

The invention also concerns a method of producing a water channel for a fuel assembly for a nuclear boiling water reactor, which water channel is intended to form part of said fuel assembly for enabling a flow through the fuel assembly of non-boiling water, which method comprises producing and treating a plurality of sheets with the method according to any of the above described embodiments, and accomplishing a suitable shape of these sheets and joining the sheets such that said water channel is formed.

Through these methods of producing channel boxes and a water channel, respectively, the advantages which are described above concerning the used sheet are obtained.

The invention also concers a fuel assembly for a nuclear boiling water reactor, comprising:

a channel box with a material structure obtained by the fact that the sheet which forms at least the main part of the walls of the channel box is produced and treated according to the method according to any of the above described embodiments, and a plurality of fuel rods comprising nuclear fuel material arranged within said channel box.

The invention also concerns a fuel assembly for a nuclear boiling water reactor comprising:
at least one water channel with a material structure obtained by the fact that the sheet that forms at least the main part of the walls of the water channel is produced and treated according to the method according to any of the above embodiments.

Also the above described fuel assemblies have advantageous properties since the sheet that is used for the walls of the channel box and the water channel, respectively, is produced and treated with the advantageous method according to the invention.

SHORT DESCRIPTION OF THE DRAWINGS

Figure 1:
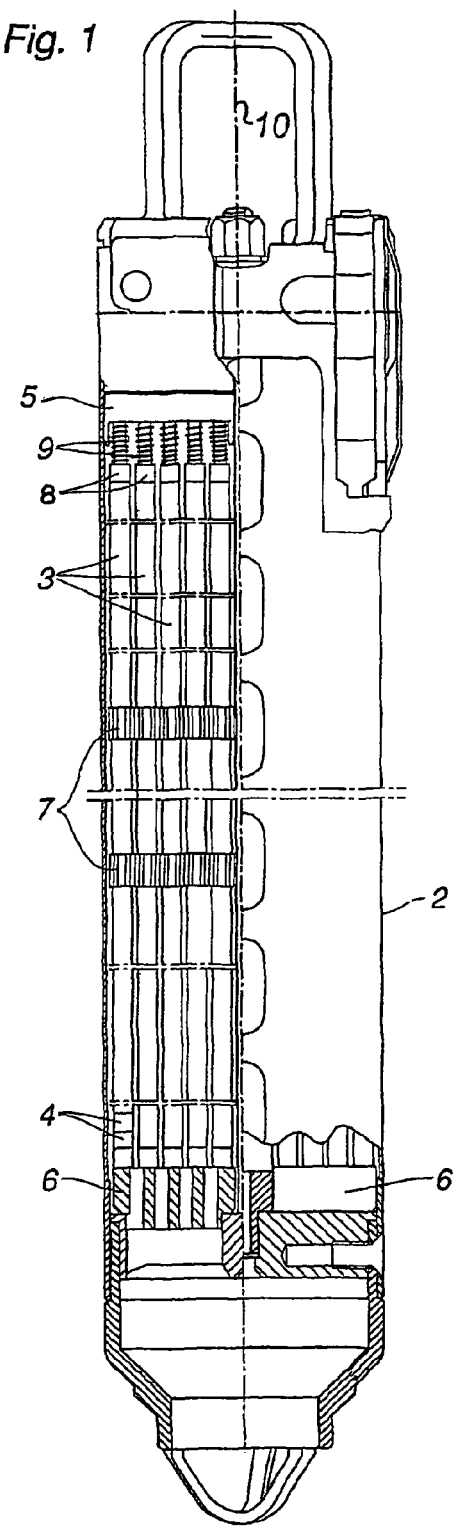

FIG. 1 shows schematically a fuel assembly for a nuclear boiling water reactor.

Figure 2:
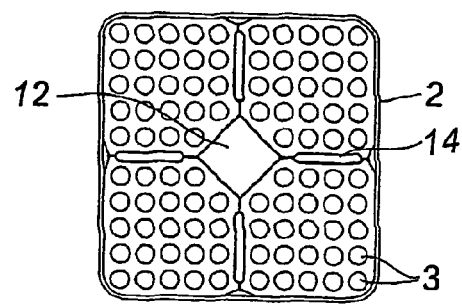
FIG. 2 shows schematically a cross-section of a fuel assembly for a BWR. This cross-section shows that the fuel assembly comprises a central water channel 12 with a square cross-section and four smaller water channels 14.

FIG. 2 shows schematically a cross-section through a fuel assembly for a nuclear boiling water reactor.

Figure 3:
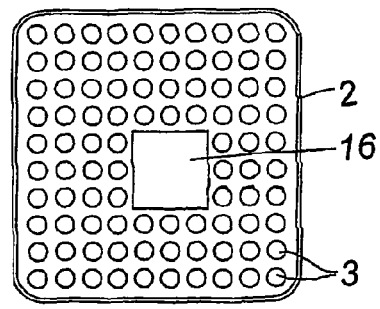
FIG. 3 shows schematically a cross-section of another construction of a fuel assembly for a BWR. This cross-section shows that the fuel assembly in this case only comprises one water channel 16 which has a square cross-section.

FIG. 3 shows schematically a cross-section through a boiling water reactor of another construction.

FIG. 4 shows schematically a cross-section of two U-shaped profiles before they are joined.

FIG. 5 shows schematically the U-shaped profiles according to FIG. 4 after they have been joined.

Figure 6:
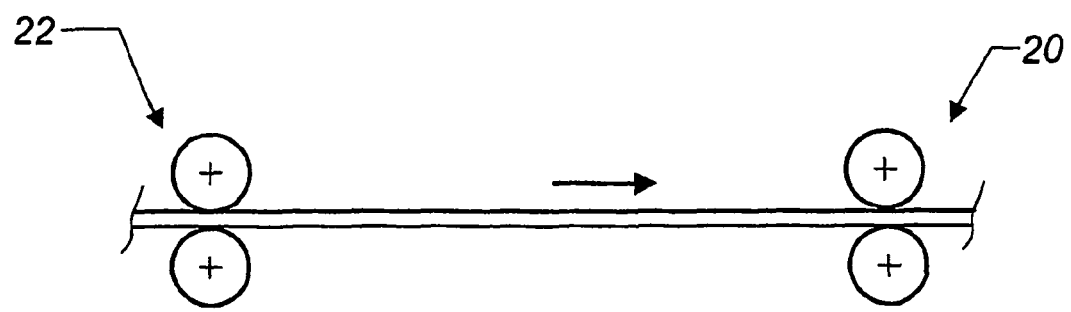

FIG. 6 shows schematically a sideview of a sheet in a device with which the sheet can be stretched.

DESCRIPTION OF EMBODIMENTS OF THE INVENTION

An example of a method according to the invention to produce and treat a sheet that is suited to be used as a component or as a part of a component in a fuel assembly for a nuclear light water reactor will now be described.

As a starting material a Zr-based alloy is used which contains at least 96 weight percent Zr. The alloy is of such a kind that it is suited to be used for for example a channel box or a water channel in a nuclear boiling water reactor. For example, the known alloys Zircaloy-2 or Zircaloy-4 may be used. Examples of alloying contents are given in the above mentioned WO-A1-97/40659. Also other Zr-based alloys which are suited for the use can be used. It is well known to a person skilled in the art that the alloying contents which is the case in Zircaloy-2 or Zircaloy-4 can be modified in different manners in the order to achieve desired properties. Also for example Zr-based alloys where the largest alloying constituent is Nb may be used. As an example, the use of an alloy of Zircaloy-4 will be described below.

An ingot is produced of this alloy. The ingot is forged within the β-phase temperature range, at a temperature of about 1150° C.

Conventional forging for reducing the thickness of the material is carried out within the α-phase temperature range. Thereafter the thickness is further reduced by hot rolling after preheating to for example 950° C. during 15 minutes or 750° C. during 45 minutes. The hot rolling is carried out to a thickness of about 20 mm to 30 mm. Thereafter a second hot rolling follows to a thickness of about 4 mm at a maximum temperature of 650° C.

Between these hot rollings possibly a heat treatment at about 1020° C. during 5 to 10 minutes may be carried out in order to homogenise the alloying elements.

Thereafter a cold rolling is carried out in a number of steps in order to reduce the thickness to the final thickness or at least almost to the final thickness. For example, one to three cold rollings may be carried out in order to achieve the correct permissible variation of the sheet thickness and the surface finish. Between each cold rolling, the material is suitably heat treated at about 730° C. in a continuous oven process.

Thereafter the material is β quenched in that it is heated to about 1050° C. during about 10 seconds whereafter a quenching is carried out. The cooling speed may for example be about 25° C. per second.

After the β quenching, the sheet is heat-treated at about 750° C. in a continuous oven process. The heat treatment may for example take place during 2-10 minutes, preferably during about 8 minutes. During this heat treatment, the sheet is stretched such that a remaining elongation of about 0.5% is achieved. With remaining elongation is here meant that the sheet has been elongated this much directly after the stretching as compared to immediately before the stretching. Thereafter possibly the sheet may contract somewhat when it cools in accordance with the coefficient of heat extension of the material.

FIG. 6 shows schematically how the stretching of the sheet may be carried out in a continuous process. The sheet is fed forward in the direction that is marked with an arrow with the help of a front pair of rollers 20 and a rear pair of rollers 22. If the feeding speed with the front pair of rollers 20 is a little higher than the feeding speed with the rear pair of roller 22, the sheet goes through a stretching during the feed. It should be noted that preferably this feed takes place in an oven such that the sheet is heated at the same time as it is stretched. It should be noted that the stretching does not necessarily have to take place in a continuous process with the help of rollers such as is shown in FIG. 6. It is also possible that the sheet is arranged in some other kind of stretching device in order to carry out the stretching.

Preferably, the sheet is long and the stretching is carried out in the longitudinal direction of the sheet. This longitudinal direction thereby suitably corresponds to the longitudinal direction of the component for which the sheet is to be used.

The produced sheet is preferably used as a component or as a part of a component in a fuel assembly for a nuclear light water reactor, preferably a nuclear boiling water reactor. The sheet may for example be used for the channel box 2 which surrounds such a fuel assembly. Another use is for the water channel or the water channels 12, 14, 16 which may form part of such a fuel assembly.

A channel box 2 for a fuel assembly for a BWR may be produced in that two sheets of a suitable dimension are produced. These sheets are thereafter bent to U-shaped profiles such as is shown in FIG. 4. Possibly, the sheets may be heated somewhat, for example to about 200° C., before they are bent. The U-shaped profiles are thereafter welded together in a manner which is well known to a person with knowledge within the field. Possibly, the channel box 2 may be shaped in that it is positioned on a fitting of stainless steel, whereafter heating takes place in order to transfer the shape of the fitting to the channel box 2.

A water channel 12, 14, 16 for non-boiling water for a fuel assembly for a BWR may be produced in a similar manner. A sheet is produced with the method according to the invention. Sheets of suitable dimensions are produced. These parts are shaped and welded together such that a water channel 12, 14, 16 of a suitable shape is obtained. This shape may for example constitute a cruciform water channel which consists of different channel parts 12, 14 such as is shown in FIG. 2 or as a square water channel 16 of the kind that is shown in FIG. 3.

The invention also concerns a fuel assembly for a nuclear BWR. Such a fuel assembly has a channel box 2 with a material structure, flatness and straightness obtained in that the sheet which forms the walls of the channel box 2 is produced and treated according to the method which has been described above. The fuel assembly may for example be of the kind which is shown schematically in FIG. 1.

The invention also concerns a fuel assembly for a BWR of which at least one water channel 12, 14, 16 forms a part. This water channel 12, 14, 16 has a material structure, flatness and straightness obtained in that the sheet is produced and treated according to the method which is described above. Of course, the fuel assembly may have both a channel box 2 and a water channel 12, 14, 16 which are fabricated of sheets which are produced and treated with the method according to the invention.

The invention is not limited to the above described examples but may be varied within the scope of the following claims.

The invention claimed is:

1. A method of producing and treating a sheet suited to be used as a component or as a part of a component in a fuel assembly for a nuclear light water boiling water reactor, which method comprises the following steps:
   a) producing a sheet of a Zr-based alloy by forging, hot rolling and cold rolling in a suitable number of steps, wherein said alloy contains at least about 96 weight percent Zr;
   b) carrying out one of an α+β quenching and β quenching of the sheet when the sheet has been produced to a thickness which is one of equal to the final thickness of the finished sheet and approximately equal to the final thickness of the finished sheet;
   c) heat treating of the sheet in the α-phase temperature range of said alloy, wherein step c) is carried out after steps a) and b) have been carried out, and wherein the sheet is stretched during the heat treatment according to step c);
      wherein said stretching and said heat treatment during step c) are carried out in a continuous oven process;
      wherein said stretching is carried out such that the sheet directly after having gone through the stretching has a remaining elongation compared to the state of the sheet immediately before the stretching;
      wherein said remaining elongation is between about 0.1% and about 7%; and
      wherein said component defines a longitudinal direction which, when the component is used in said fuel assembly, is at least substantially parallel to a longitudinal direction of the fuel assembly and wherein said stretching of the sheet is carried out in a direction which corresponds to the longitudinal direction of said component for which the sheet is intended.

2. A method according to claim 1, wherein step b) is a βquenching.

3. A method according to claim 1, wherein said stretching is carried out at a temperature of at most the temperature which constitutes the highest temperature in the α-phase temperature range of the alloy and at least at the temperature which is about 70% of said highest temperature in ° K.

4. A method according to claim 3, wherein said stretching is carried out at a temperature which is between about 80% and about 98% of said highest temperature in ° K.

5. A method according to claim 1, wherein said stretching is carried out such that said elongation is longer than a critical degree of deformation of the alloy.

6. A method of producing and treating a sheet suited to be used as a component or as a part of a component in a fuel assembly for a nuclear light water boiling water reactor, which method comprises the following steps:
   a) producing a sheet of a Zr-based alloy by forging, hot rolling and cold rolling in a suitable number of steps, wherein said alloy contains at least about 96 weight percent Zr;
   b) carrying out one of an α+β quenching and a β quenching of the sheet when the sheet has been produced to a thickness which is one of equal to the final thickness of the finished sheet and approximately equal to the final thickness of the finished sheet;
   c) heat treating of the sheet in the a-phase temperature range of said alloy, wherein step c) is carried out after steps a) and b) have been carried out, and wherein the sheet is stretched during the heat treatment according to step c);
      wherein said stretching and said heat treatment during step c) are carried out in a continuous oven process;
      wherein said stretching is carried out such that the sheet directly after having gone through the stretching has a remaining elongation compared to the state of the sheet immediately before the stretching; and wherein said remaining elongation is between about 0.2% and about 4%; and wherein said component defines a longitudinal direction which, when the component is used in said fuel assembly, is at least substantially parallel to a longitudinal direction of the fuel assembly and wherein said stretching of the sheet is carried out in a direction which corresponds to the longitudinal direction of said component for which the sheet is intended.

* * * * *